US012691746B2

(12) United States Patent
Chen et al.

(10) Patent No.: US 12,691,746 B2
(45) Date of Patent: Jul. 28, 2026

(54) HYBRID POWER SYSTEM AND OPERATION MACHINERY

(71) Applicant: SANY AUTOMOBILE MANUFACTURING CO. LTD, Changsha (CN)

(72) Inventors: Tianming Chen, Changsha (CN); Tao Tang, Changsha (CN); Yunming Huang, Changsha (CN)

(73) Assignee: SANY AUTOMOBILE MANUFACTURING CO. LTD, Changsha (CN)

( * ) Notice: Subject to any disclaimer, the term of this patent is extended or adjusted under 35 U.S.C. 154(b) by 290 days.

(21) Appl. No.: 18/581,662

(22) Filed: Feb. 20, 2024

(65) Prior Publication Data

US 2024/0190235 A1    Jun. 13, 2024

Related U.S. Application Data

(63) Continuation of application No. PCT/CN2022/073522, filed on Jan. 24, 2022.

(30) Foreign Application Priority Data

Aug. 27, 2021    (CN) .......................... 202122051555.7

(51) Int. Cl.
B60K 6/40        (2007.10)
B60K 17/02        (2006.01)
(Continued)

(52) U.S. Cl.
CPC ............... B60K 6/40 (2013.01); B60K 17/02 (2013.01); B60K 17/06 (2013.01); B60K 17/10 (2013.01);
(Continued)

(58) Field of Classification Search
CPC ...... A01D 75/008; A01D 34/78; A01D 34/66; A01D 2101/00; B60K 1/02; B60L 1/00; B60L 2200/40
(Continued)

(56) References Cited

U.S. PATENT DOCUMENTS 7,610,976 B2 *  11/2009  Holmes ................ B60W 10/115
                                            180/65.265
8,307,924 B2 *  11/2012  Wang ..................... B60K 6/442
                                            180/65.23
8,474,556 B2 *  7/2013  Wang ..................... B60L 50/61
                                            180/65.285
8,540,601 B2 *  9/2013  Wang ..................... B60K 6/442
                                            180/65.22

(Continued)

FOREIGN PATENT DOCUMENTS

CN        202672737 U      1/2013
CN        105667295 A      6/2016
(Continued)

OTHER PUBLICATIONS

Translation of CN 113085529A accessed on Feb. 21, 2026 at www.espacenet.com (Year: 2021).*
(Continued)

*Primary Examiner* — James A Shriver, II
*Assistant Examiner* — Hilary L Johns
(74) *Attorney, Agent, or Firm* — Westbridge IP LLC

(57)        ABSTRACT
Disclosed is a hybrid power system and an operation machinery. The hybrid power system includes an engine, a power distribution device, and a double-shaft extension motor. An input end of the power distribution device is connected to the output end of the engine, a first power output end of the power distribution device is connected to one end of the drive shaft, the input end is connected to the first power output end; a second power output end of the power distribution device is connected to one end of the double-shaft extension motor, and the second power output end is configured to selectively coupled with the input end (Continued)

or separated from the input end; another end of the double-shaft extension motor is configured to connect with the hydraulic power system.

10 Claims, 5 Drawing Sheets

(51) Int. Cl.

| | | |
|---|---|---|
| *B60K 17/06* | (2006.01) | |
| *B60K 17/10* | (2006.01) | |
| *B60K 17/22* | (2006.01) | |
| *B60K 17/28* | (2006.01) | |
| *B60P 3/22* | (2006.01) | |
| B60L 15/04 | (2006.01) | |

(52) U.S. Cl.
CPC .............. *B60K 17/22* (2013.01); *B60K 17/28* (2013.01); *B60P 3/225* (2013.01); *B60L 15/04* (2013.01); *B60L 2210/30* (2013.01)

(58) Field of Classification Search
USPC ...................................................... 180/65.1
See application file for complete search history.

(56) References Cited

U.S. PATENT DOCUMENTS

| | | | | |
|---|---|---|---|---|
| 10,427,520 B2 * | 10/2019 | Dalum | .................. | B60K 25/06 |
| 2007/0256870 A1 * | 11/2007 | Holmes | ................ | B60W 10/26 |
| | | | | 903/910 |
| 2018/0195595 A1 * | 7/2018 | Huang | ................... | F16H 37/06 |

FOREIGN PATENT DOCUMENTS

| | | | | | |
|---|---|---|---|---|---|
| CN | 109703357 | A | | 5/2019 | |
| CN | 111216540 | A | | 6/2020 | |
| CN | 111469651 | A | | 7/2020 | |
| CN | 211918368 | U | | 11/2020 | |
| CN | 113085529 | A | * 7/2021 | .............. B60K 6/24 |
| WO | 2008151461 | A1 | | 12/2008 | |

OTHER PUBLICATIONS

Extended European Search Report issued in counterpart European Patent Application No. 22859791.0, dated Jun. 24, 2025.
International Search Report and Written Opinion issued in corresponding PCT Application No. PCT/CN2022/073522, dated May 27, 2022.

* cited by examiner

HYBRID POWER SYSTEM AND OPERATION MACHINERY

CROSS-REFERENCE TO RELATED APPLICATIONS

The present application is a continuation application of International Application No. PCT/CN2022/073522, filed on Jan. 24, 2022, which claims priority to Chinese Patent Application No. 202122051555.7, filed on Aug. 27, 2021. The disclosures of the above-mentioned applications are incorporated herein by reference in their entireties.

TECHNICAL FIELD

The present application relates to the technical field of hybrid power systems, and in particular to a hybrid power system and an operation machinery.

BACKGROUND

During on-site construction operations, in order to meet various operating conditions, multiple sets of hydraulic power systems are provided on the operation machinery. Existing hydraulic power systems are usually driven by engines. With the improvement of people's environmental awareness and the increasing demand for energy conservation and emission reduction in actual production operations, the electrification design of operation machinery such as concrete pump trucks and cranes has received more and more attention and attention. However, in the actual operation process of operation machinery, relying solely on electric drive is often unable to meet the high-power operation of operation machinery. Operation machinery of hybrid power not only takes into account operational needs, but also achieves energy conservation and emission reduction. Therefore, operation machinery with hybrid power is widely used in actual production.

There are two types of hybrid power solutions for existing operating machinery. The first solution is to connect the engine and electric motor together to a hydraulic power system. Since the engine can only provide power to the hydraulic power system, in order to realize the travelling function of the operation machinery, another engine or electric motor is required to drive the movement of operation machinery. This hybrid power solution has complex structure and single function, and takes up a large layout space. The second solution is to connect the electric motor and the engine to a hydraulic power system respectively, the engine is configured to drive the operation machinery to travel, and the electric motor is configured to provide driving force for the hydraulic power system on the operation machinery. When the electric motor drives the hydraulic power system normally, a set of the hydraulic power system connected to the engine is in a non-operating state, only when the power of the electric motor is insufficient, the set of the hydraulic power system connected to the engine will be activated to make the engine and the electric motor to provide driving force for the hydraulic power system together. Since this hybrid solution has two sets of hydraulic power systems, the structure is complicated, and at the same time, the electric motor cannot drive the operation machinery to travel, the power of the electric motor cannot be fully utilized, thus resulting in unreasonable power distribution. It can be seen from the above that the two above-mentioned hybrid power solutions cannot conveniently realize power switching between the engine and the electric motor, and thus cannot achieve power distribution relatively well.

SUMMARY

The present application provides a hybrid power system and an operation machinery to solve the problem that the hybrid power system of the existing operation machinery cannot achieve power distribution relatively well.

The present application provides a hybrid power system including an engine, a power distribution device and a double-shaft extension motor, an output end of the engine is configured to drive a drive shaft of a walking system of an operation machinery, the operation machinery is provided with at least one set of hydraulic power system; an input end of the power distribution device is connected to the output end of the engine, a first power output end of the power distribution device is connected to one end of the drive shaft, the input end is connected to the first power output end; a second power output end of the power distribution device is connected to one end of the double-shaft extension motor, and the second power output end is configured to selectively be coupled with the input end or separated from the input end; another end of the double-shaft extension motor is configured to connect with the hydraulic power system; and the power distribution device is provided with a power coupling state and a separation state; in the power coupling state, the first power output end and the second power output end form a power coupling connection, so that the engine is connected to the double-shaft extension motor; in the separation state, the input end and the second power output end are separated, so that the engine and the double-shaft extension motor are separated.

The hybrid power system provided according to the present application, the power distribution device is a power take-off, a plurality of the power take-offs are provided in one-to-one correspondence with the double-shaft extension motor, and the other ends of the plurality of the double-shaft extension motors are configured to connect to multiple sets of the hydraulic power systems in one-to-one correspondence.

The hybrid power system provided according to the present application, the power distribution device is a power take-off; further including: a first transmission; the power take-offs includes a first power take-off; the double-shaft extension motors includes a first double-shaft extension motor; the output end of the engine is connected to an input end of the first power take-off, a first power output end of the first power take-off is connected to an input end of the first transmission, and an output end of the first transmission is connected to one end of the drive shaft; a second power output end of the first power take-off is connected to one end of the first double-shaft extension motor; and the first transmission at least includes a first gear and a second gear, when the first transmission is in the first gear, the input end of the first transmission is separated from the output end of the first transmission; when the first transmission is in the second gear, the input end of the first transmission is in a power coupling connection with the output end of the first transmission.

The hybrid power system provided according to the present application, the power distribution device is a power take-off; further including: a second transmission; the power take-offs includes a second power take-off, and the double-shaft extension motors includes a second double-shaft extension motor and a third double-shaft extension motor; the second transmission includes a speed change unit and a power take-off unit; an output end of the power take-off unit is connected to a first output end of the speed change unit, or an output end of the power take-off unit is a first output end of the speed change unit; an input end of the speed change unit is configured to selectively connect to a power take-off input end of the power take-off unit or a second output end of the speed change unit; the input end of the speed change unit is configured to selectively connect to any one of the first output end of the speed change unit and the second output end of the speed change unit; the first output end of the speed change unit and the second output end of the speed change unit are configured to selectively in a power coupling or separate; the output end of the engine is connected to an input end of the second power take-off, a first power output end of the second power take-off is connected to the input end of the speed change unit, a second power output end of the second power take-off is connected to one end of the second double-shaft extension motor, and another end of the second double-shaft extension motor is configured to connect with a pumping hydraulic system; and the first output end of the speed change unit is connected to one end of the third double-shaft extension motor, another end of the third double-shaft extension motor is configured to connect with a boom hydraulic system, and the second output end of the speed change unit is connected to one end of the drive shaft.

The hybrid power system provided according to the present application, further including: a first clutch; an input end of the first clutch is connected to the output end of the engine, and an output end of the first clutch is connected to the input end of the second power take-off.

The hybrid power system provided according to the present application, further including: a third transmission; the power take-offs includes a third power take-off and a fourth power take-off; the double-shaft extension motors includes a fourth double-shaft extension motor and a fifth double-shaft extension motor; the output end of the engine is connected to an input end of the third power take-off, a first power output end of the third power take-off is connected to an input end of the third transmission, an output end of the third transmission is connected to an input end of the fourth power take-off, and a first power output end of the fourth power take-off is connected to one end of the drive shaft; a second power output end of the third power take-off is connected to one end of the fourth double-shaft extension motor, and another end of the fourth double-shaft extension motor is configured to connect with a pumping hydraulic system; a second power output end of the fourth power take-off is connected to one end of the fifth double-shaft extension motor, and another end of the fifth double-shaft extension motor is configured to connect with a boom hydraulic system; and the third transmission at least includes a first gear and a second gear, when the third transmission is in the first gear, the input end of the third transmission is separated from the output end of the third transmission; when the third transmission is in the second gear, the input end of the third transmission is in a power coupling connection with the output end of the third transmission.

The hybrid power system provided according to the present application, further including: a first alternating-current/direct-current conversion module; an alternating-current side of the first alternating-current/direct-current conversion module is electrically connected to a stator winding of the double-shaft extension motor, and a direct-current side of the first alternating-current/direct-current conversion module is configured to electrically connect to an energy storage module.

The hybrid power system provided according to the present application, further including: a second alternating-current/direct-current conversion module; and an alternating-current side of the second alternating-current/direct-current conversion module is configured to be electrically connected to a commercial power supply, and a direct-current side of the second alternating-current/direct-current conversion module is configured to electrically connect to the energy storage module.

The hybrid power system provided according to the present application, further including: an alternating-current/alternating-current conversion module; one end of the alternating-current/alternating-current conversion module is electrically connected to a stator winding of the double-shaft extension motor, and another end of the alternating-current/alternating-current conversion module is configured to electrically connect to a commercial power supply.

The hybrid power system provided according to the present application, further including: a control module; the control module is communicatively connected to the engine, the hydraulic power system, the power distribution device and the double-shaft extension motor respectively.

The present application also provides an operating machinery, including the hybrid power system as described above.

The operation machinery provided according to the present application, the operation machinery includes a concrete pump truck, and the hydraulic power system includes a pumping hydraulic system and a boom hydraulic system; and two double-shaft extension motors are provided, another end of one of the double-shaft extension motors is connected to the pumping hydraulic system, and another end of the other double-shaft extension motor is connected to the boom hydraulic system.

The present application provides a hybrid power system and an operation machinery, by setting up an engine, a double-shaft extension motor and a power distribution device, it can be based on actual needs, when the engine performs power output, the engine can be connected to the hydraulic power system by the power distribution device and the rotor of the double-shaft extension motor in sequence. On the one hand, it can realize that the engine provides driving force for the hydraulic power system alone. On the other hand, it can realize that the engine provides driving force for the drive shaft alone. At this time, the external power generation load can be electrically connected to the stator winding of the double-shaft extension motor, so that the double-shaft extension motor can be configured as an electric generator. When the double-shaft extension motor performs power output, connecting the stator winding of the double-shaft extension motor to commercial power, the double-shaft extension motor can be connected to the drive shaft by the power distribution device. On the one hand, it can realize that the double-shaft extension motor provides driving force for the hydraulic power system alone. On the other hand, it can realize that the double-shaft extension motor provides driving force for the drive shaft alone. At this time, the double-shaft extension motor is configured as an electric motor, and the engine is in an idle state. When the engine and the double-shaft extension motor work together to perform power output, connecting the stator winding of the double-shaft extension motor to the commercial power, the engine can be connected to the hydraulic power system by the power distribution device and the rotor of the double-shaft extension motor in sequence, and the double-shaft extension motor can be connected to the drive shaft by the power distribution device in sequence. On the one hand, it can realize that the engine and the double-shaft extension motor work together to provide driving force for the hydraulic power system. On the other hand, it can realize that the engine and the double-shaft extension motor work together to provide driving force for the drive shaft.

It can be seen that the present application can conveniently realize on-demand distribution of the power of the hybrid power system by changing the working state of the power distribution device according to actual needs.

BRIEF DESCRIPTION OF THE DRAWINGS

In order to explain the embodiments of the present application or the technical solutions in the existing technology more clearly, the accompanying drawings needed to be used in the description of the embodiments or the existing technology will be briefly introduced below. Obviously, the accompanying drawings in the following description are only some embodiments of the present application, other accompanying drawings can be obtained based on the provided accompanying drawings without exerting creative efforts for those of ordinary skill in the art.

DETAILED DESCRIPTION OF THE EMBODIMENTS

Figure 1:
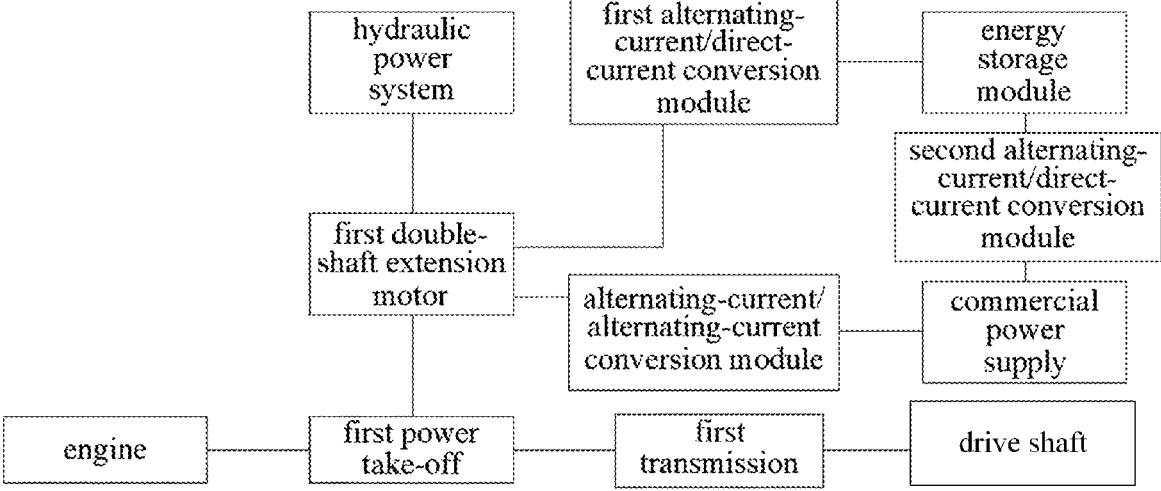
FIG. 1 is a first structural schematic view of a hybrid power system provided according to the present application.

In order to make the purpose, technical solutions and advantages of the present application clearer, the technical solutions in the embodiments of the present application will be clearly and completely described below in conjunction with the accompanying drawings in the embodiments of the present application. Obviously, the described embodiments are only some of the embodiments of the present application, but not all of the embodiments. Based on the embodiments of the present application, all other embodiments obtained by those of ordinary skill in the art without any creative work fall within the scope of the present application.

A hybrid power system and an operation machinery provided according to the present application will be described below in conjunction with FIG. 1 to FIG. 5.

As shown in FIG. 1 to FIG. 4, this embodiment provides a hybrid power system and an operation machinery. The hybrid power system includes an engine, a power distribution device and a double-shaft extension motor. An output end of the engine is configured to drive a drive shaft of a walking system of an operation machinery, the operation machinery is provided with at least one set of hydraulic power system. An input end of the power distribution device is connected to the output end of the engine, a first power output end of the power distribution device is connected to one end of the drive shaft, the input end of the power distribution device is connected to the first power output end; a second power output end of the power distribution device is connected to one end of the double-shaft extension motor, and the second power output end is configured to selectively be coupled with the input end or separated from the input end; another end of the double-shaft extension motor is configured to connect with the hydraulic power system. The power distribution device is provided with a power coupling state and a separation state. In the power coupling state, the first power output end and the second power output end form a power coupling connection, so that the engine is connected to the double-shaft extension motor. In the separation state, the input end and the second power output end are separated, so that the engine and the double-shaft extension motor are separated.

Specifically, by setting up an engine, a double-shaft extension motor and a power distribution device, the hybrid power system shown in this embodiment can be based on actual needs, when the engine performs power output, the engine can be connected to the hydraulic power system by the power distribution device and the rotor of the double-shaft extension motor in sequence. On the one hand, it can realize that the engine provides driving force for the hydraulic power system alone. On the other hand, it can realize that the engine provides driving force for the drive shaft alone. At this time, the external power generation load can be electrically connected to the stator winding of the double-shaft extension motor, so that the double-shaft extension motor can be used as an electric generator. When the double-shaft extension motor performs power output, connecting the stator winding of the double-shaft extension motor to commercial power, the double-shaft extension motor can be connected to the drive shaft by the power distribution device. On the one hand, it can realize that the double-shaft extension motor provides driving force for the hydraulic power system alone. On the other hand, it can realize that the double-shaft extension motor provides driving force for the drive shaft alone. At this time, the double-shaft extension motor is used as an electric motor, and the engine is in an idle state. When the engine and the double-shaft extension motor work together to perform power output, connecting the stator winding of the double-shaft extension motor to the commercial power, the engine can be connected to the hydraulic power system by the power distribution device and the rotor of the double-shaft extension motor in sequence, and the double-shaft extension motor can be connected to the drive shaft by the power distribution device in sequence. On the one hand, it can realize that the engine and the double-shaft extension motor work together to provide driving force for the hydraulic power system. On the other hand, it can realize that the engine and the double-shaft extension motor work together to provide driving force for the drive shaft. This embodiment can conveniently realize on-demand distribution of the power of the hybrid power system by changing the working state of the power distribution device according to actual needs.

When the double-shaft extension motor is used as an electric generator, the power output from the engine drives the rotor of the double-shaft extension motor to rotate; when the double-shaft extension motor is used as an electric motor, by electrically connecting the commercial power to the stator winding of the double-shaft extension motor, so as to achieve that the rotor of the double-shaft extension motor is driven to rotate.

It should be noted here that the input end of the power distribution device shown in this embodiment is connected to the first power output end, the first power output end and the second power output end are connected by gears. When the power distribution device is in the power coupling state, the gears between the first power output end and the second power output end are meshed so that the engine is connected to the double-shaft extension motor. When the power distribution device is in a separation state, the gears between the first power output end and the second power output end are separated from each other, then the input end of the power distribution device and the second power output end are separated, so that the engine and the double-shaft extension motor are separated.

It should further be pointed out here that the input end of the power distribution device shown in this embodiment is connected to the output end of the engine, which can be understood as, the input end of the power distribution device is detachably connected to the output end of the engine, or the input end of the power distribution device is connected to the engine by a clutch.

Correspondingly, the first power output end of the power distribution device shown in this embodiment is connected to one end of the drive shaft, which can be understood as, the first power output end of the power distribution device is detachably connected to one end of the drive shaft, or the first power output end of the power distribution device is connected to one end of the drive shaft by a transmission.

In an embodiment, the power distribution device shown in this embodiment is specifically configured as a power take-off. In practical applications, a plurality of the power take-offs are provided in one-to-one correspondence with the double-shaft extension motor, and the other ends of the plurality of the double-shaft extension motors are connected to multiple sets of the hydraulic power systems in one-to-one correspondence.

When the hybrid power system shown in this embodiment is applied to a concrete pump truck, since the hydraulic power system on the concrete pump truck includes the pumping hydraulic system and the boom hydraulic system, then two double-shaft extension motors shown in this embodiment can be provided, and the other ends of the two double-shaft extension motors are connected with the above two sets of hydraulic power systems in one-to-one correspondence.

Figure 2:
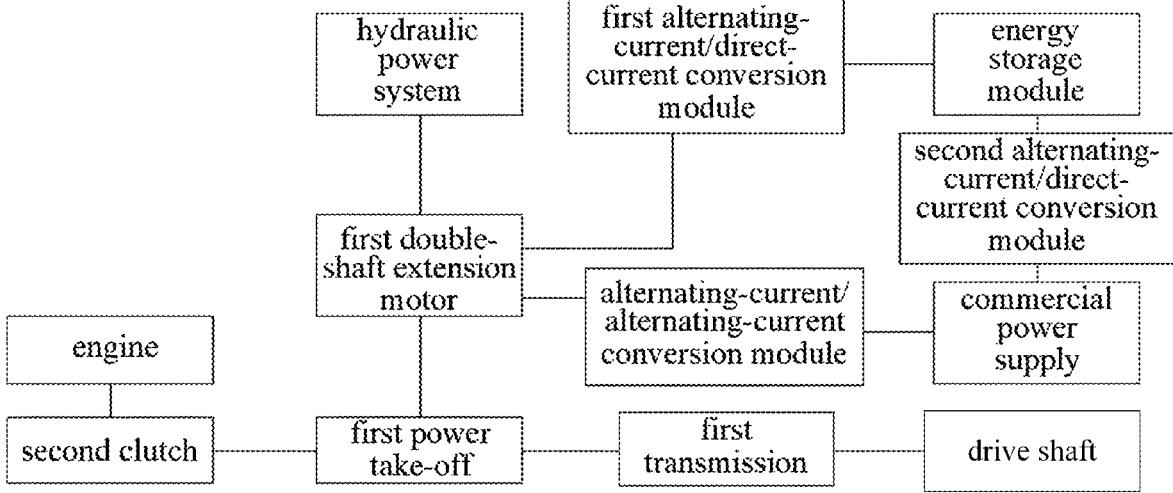
FIG. 2 is a second structural schematic view of a hybrid power system provided according to the present application.

In an embodiment, as shown in FIG. 1 and FIG. 2, when one set of hydraulic power system is provided, then one power distribution device and one double-shaft extension motor are provided, and another end of the double-shaft extension motor is connected to the hydraulic power system.

In an embodiment, as shown in FIG. 1, the hybrid power system shown in this embodiment further includes a first transmission, the power distribution device is a power take-off, the power take-offs includes a first power take-off; the double-shaft extension motors includes a first double-shaft extension motor; the output end of the engine is connected to an input end of the first power take-off, a first power output end of the first power take-off is connected to an input end of the first transmission, and an output end of the first transmission is connected to one end of the drive shaft; a second power output end of the first power take-off is connected to one end of the first double-shaft extension motor; and the first transmission at least includes a first gear and a second gear, when the first transmission is in the first gear, the input end of the first transmission is separated from the output end of the first transmission; when the first transmission is in the second gear, the input end of the first transmission is in a power coupling connection with the output end of the first transmission.

Specifically, the power output from the output end of the engine not only can be transmitted to the drive shaft by the first power take-off and the first transmission, but also can be transmitted to the hydraulic power system by the first power take-off, thus realizing that the engine drives the drive shaft and/or the hydraulic power system. The power output by the first double-shaft extension motor can be transmitted to the drive shaft by the first power take-off and the first transmission, thus realizing that the first double-shaft extension motor drives the drive shaft. At this time, the engine is in an idling state.

As shown in FIG. 2, the hybrid power system shown in this embodiment further includes a second clutch, the input end of the second clutch is connected to the output end of the engine, and the output end of the second clutch is connected to the input end of the first power take-off.

Specifically, when the first double-shaft extension motor drives the drive shaft alone, by adjusting the input end of the second clutch and the output end of the second clutch to the separation state, the power separation between the engine and the first double-shaft extension motor can be realized, thus avoiding the engine acting as the load of the first double-shaft extension motor. When the hydraulic power system is driven by the engine, if there is no rotation requirement for the drive shaft at this time, by adjusting the first transmission to the first gear to avoid the power of the engine from being transmitted to the drive shaft.

Figure 3:
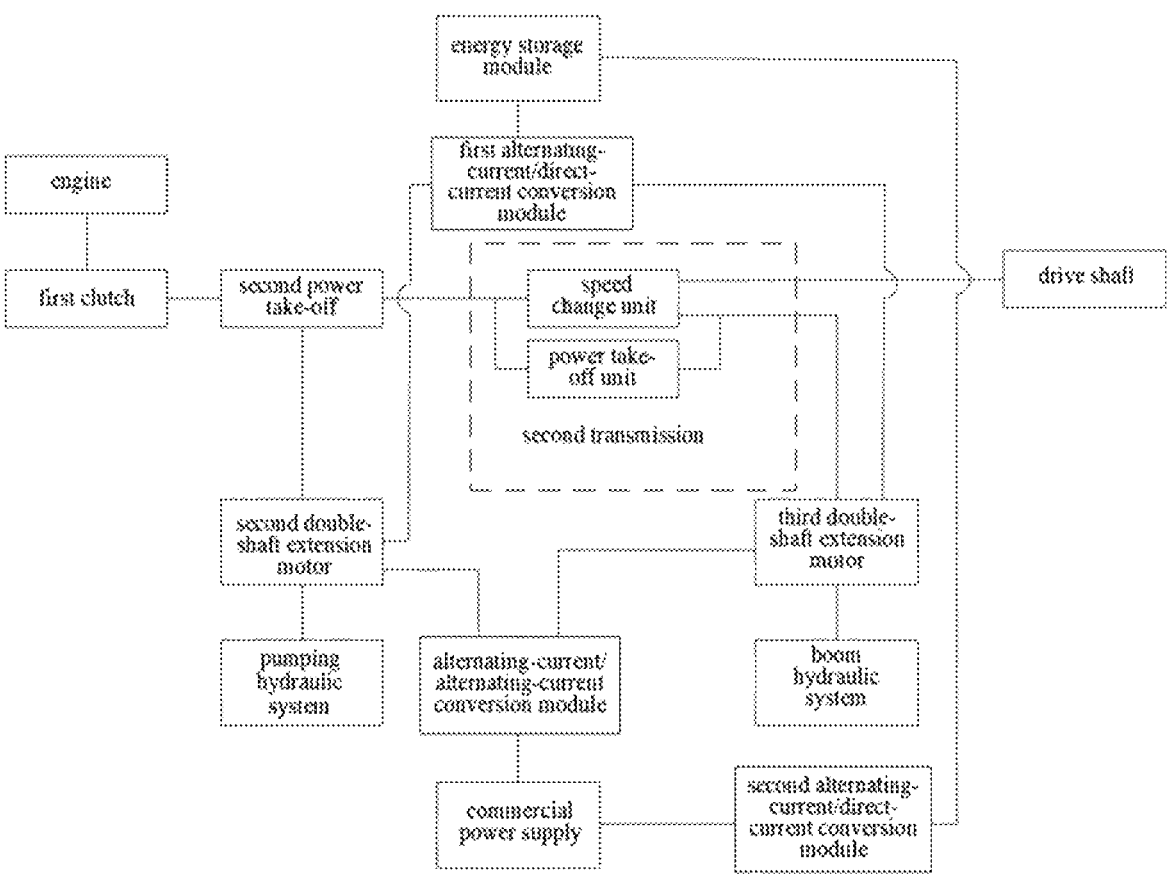
FIG. 3 is a third structural schematic view of a hybrid power system provided according to the present application.

As shown in FIG. 3, in an embodiment, the hybrid power system further includes a second transmission; the power distribution device is a power take-off, the power take-offs includes a second power take-off; the double-shaft extension motors includes a second double-shaft extension motor and a third double-shaft extension motor; the second transmission includes a speed change unit and a power take-off unit; an output end of the power take-off unit is connected to a first output end of the speed change unit, or an output end of the power take-off unit is a first output end of the speed change unit; an input end of the speed change unit is configured to selectively connect to a power take-off input end of the power take-off unit or a second output end of the speed change unit; the first output end of the speed change unit and the second output end of the speed change unit are configured to selectively in a power coupling or separate; the output end of the engine is connected to an input end of the second power take-off, a first power output end of the second power take-off is connected to the input end of the speed change unit, a second power output end of the second power take-off is connected to one end of the second double-shaft extension motor, and another end of the second double-shaft extension motor is configured to connect with a pumping hydraulic system; and the first output end of the speed change unit is connected to one end of the third double-shaft extension motor, another end of the third double-shaft extension motor is configured to connect with a boom hydraulic system, and the second output end of the speed change unit is connected to one end of the drive shaft.

Specifically, the power output from the output end of the engine shown in this embodiment not only can be transmitted to the drive shaft by the second power take-off and the second transmission, but also can be transmitted to the pumping hydraulic system by the second power take-off. Since the second transmission shown in this embodiment further integrates a power take-off unit, therefore, the power output from the output end of the engine can be further transmitted to the boom hydraulic system by the power take-off unit, thus realizing that the engine drives the drive shaft and/or two sets of hydraulic power systems alone.

At the same time, the power output by the second double-shaft extension motor can be transmitted to the drive shaft by the second power take-off and the speed change unit, the power output by the third double-shaft extension motor can be transmitted to the drive shaft by the power take-off unit and the speed change unit, thus realizing that the second double-shaft extension motor and/or the third double-shaft extension motor drives the drive shaft. At this time, the engine is in an idling state.

It should be noted here that when the third double-shaft extension motor acts as an electric motor, when the drive shaft is driven by the third double-shaft extension motor, the power output by the third double-shaft extension motor is first transmitted to the first output end of the speed change unit. At this time, the first output end of the speed change unit is in a power coupling connection with the second output end of the speed change unit, so that the power is transmitted to the second output end, thus finally realizing that the power is transmitted to the drive shaft.

When the third double-shaft extension motor acts as an electric motor, when the boom hydraulic system is driven by the third double-shaft extension motor alone, if there is no rotation requirement for the drive shaft at this time, then separating the first output end of the speed change unit from the second output end of the speed change unit, and separating the power take-off input end of the power take-off unit from the input end of the speed change unit. When the boom hydraulic system is driven by the engine, coupling the power take-off input end of the power take-off unit and the input end of the speed change unit, if there is no rotation requirement for the drive shaft at this time, then separating the first output end of the speed change unit and the second output end of the speed change unit to avoid that power is transmitted to the drive shaft.

Furthermore, as shown in FIG. 3, the hybrid power system shown in this embodiment further includes a first clutch; an input end of the first clutch is connected to the output end of the engine, and an output end of the first clutch is connected to the input end of the second power take-off.

Specifically, when the drive shaft is driven by the second double-shaft extension motor alone, by adjusting the input end of the first clutch and the output end of the first clutch to the separation state, the department's engine is power separated from the second double-shaft extension motor to avoid the engine from acting as a load on the second double-shaft extension motor.

Figure 4:
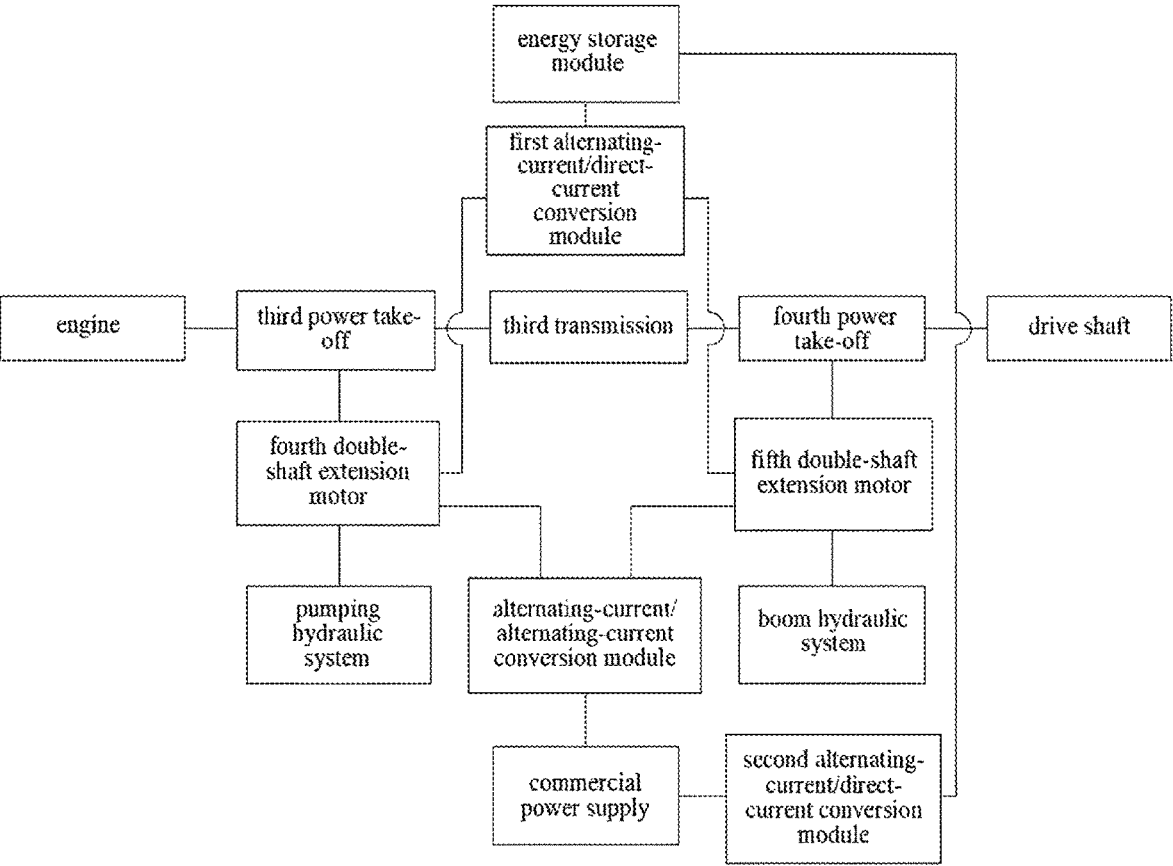
FIG. 4 is a fourth structural schematic view of a hybrid power system provided according to the present application.

As shown in FIG. 4, in another embodiment, the hybrid power system further includes a third transmission; the power take-offs includes a third power take-off and a fourth power take-off; the double-shaft extension motors includes a fourth double-shaft extension motor and a fifth double-shaft extension motor; the output end of the engine is connected to an input end of the third power take-off, a first power output end of the third power take-off is connected to an input end of the third transmission, an output end of the third transmission is connected to an input end of the fourth power take-off, and a first power output end of the fourth power take-off is connected to one end of the drive shaft; a second power output end of the third power take-off is connected to one end of the fourth double-shaft extension motor, and another end of the fourth double-shaft extension motor is configured to connect with a pumping hydraulic system; a second power output end of the fourth power take-off is connected to one end of the fifth double-shaft extension motor, and another end of the fifth double-shaft extension motor is configured to connect with a boom hydraulic system; and the third transmission at least includes a first gear and a second gear, when the third transmission is in the first gear, the input end of the third transmission is separated from the output end of the third transmission; when the third transmission is in the second gear, the input end of the third transmission is in a power coupling connection with the output end of the third transmission.

Specifically, the power output from the output end of the engine not only can be transmitted to the drive shaft by the third power take-off, the third transmission and the fourth power take-off in sequence, but also can be transmitted to the pumping hydraulic system by the third power take-off and the fourth double-shaft extension motor in sequence, and further can be transmitted to the boom hydraulic system by the third power take-off, the third transmission, the fourth power take-off and the fifth double-shaft extension motor in sequence, thus realizing that the engine drives the drive shaft and/or two sets of hydraulic power systems alone.

At the same time, the power output by the fourth double-shaft extension motor can be transmitted to the drive shaft by the third power take-off, the third transmission and the fourth power take-off in sequence, the power output by the fifth double-shaft extension motor can be transmitted to the drive shaft by the fourth power take-off, thus realizing that the fourth double-shaft extension motor and/or the fifth double-shaft extension motor provide driving force for the drive shaft. At this time, the engine is in an idling state.

It should be noted here that when the fifth double-shaft extension motor drives the drive shaft alone, adjusting the third transmission to the first gear, thus the engine can be avoided acting as a load. When the fourth double-shaft extension motor drives the drive shaft, adjusting the third transmission to the second gear. In an embodiment, as shown in FIG. 1 to FIG. 4, the hybrid power system shown in this embodiment further includes a first alternating-current/direct-current conversion module; an alternating-current side of the first alternating-current/direct-current conversion module is electrically connected to a stator winding of the double-shaft extension motor, and a direct-current side of the first alternating-current/direct-current conversion module is configured to electrically connect to an energy storage module.

Specifically, the double-shaft extension motor shown in this embodiment not only can be used as an electric motor, but also can be used as an electric generator. When the double-shaft extension motor acts as an electric motor, the direct current output by the energy storage module is converted into alternating current by the first alternating-current/direct-current conversion module, and the converted alternating current is transmitted to the double-shaft extension motor to drive the rotor of the double-shaft extension motor to rotate. When the double-shaft extension motor acts as an electric generator, the engine provides driving force for the double-shaft extension motor, so that the rotor of the double-shaft extension motor rotates relative to the stator, the alternating current generated by the stator winding is converted into direct current by the first alternating-current/direct-current conversion module, and the converted direct current is stored in the energy storage module.

The energy storage module can be a lithium iron phosphate battery or a ternary polymer lithium battery.

In an embodiment, as shown in FIG. 1 to FIG. 4, the hybrid power system shown in this embodiment further includes a second alternating-current/direct-current conversion module; and an alternating-current side of the second alternating-current/direct-current conversion module is configured to be electrically connected to a commercial power supply, and a direct-current side of the second alternating-current/direct-current conversion module is configured to electrically connect to the energy storage module.

Specifically, the energy storage module shown in this embodiment can be charged by the commercial power supply, the alternating current from the commercial power supply is converted into direct current by the second alternating-current/direct-current conversion module, and the direct current is stored in the energy storage module.

In an embodiment, as shown in FIG. 1 to FIG. 4, the hybrid power system shown in this embodiment further includes an alternating-current/alternating-current conversion module; one end of the alternating-current/alternating-current conversion module is electrically connected to a stator winding of the double-shaft extension motor, and another end of the alternating-current/alternating-current conversion module is configured to electrically connect to a commercial power supply.

Specifically, when the double-shaft extension motor shown in this embodiment acts as an electric motor, the alternating current from the commercial power supply is transmitted to the double-shaft extension motor by the alternating-current/alternating-current conversion module to drive the rotor of the double-shaft extension motor to rotate.

The alternating-current/alternating-current conversion module can be a voltage transformer in this field.

In an embodiment, the hybrid power system shown in this embodiment further includes a control module; the control module is communicatively connected to the engine, the hydraulic power system, the power distribution device and the double-shaft extension motor respectively.

Specifically, the control module shown in this embodiment is configured to control the power and rotary speed of the engine, the control module is configured to control the hydraulic flow of the hydraulic power system, and the control module is configured to control the power distribution device to switch between the power coupling state and the separation state; the control module is further configured to control the double-shaft extension motor to switch between the power-on state and the power-off state, and control the rotary speed of the double-shaft extension motor when it is in a power-on state.

In an embodiment, as shown in FIG. 2, when one set of the hydraulic power system is provided, the control module shown in this embodiment is further communicatively connected to the second clutch and the first transmission respectively, the control module is configured to control the input end of the second clutch and the output end of the second clutch to switch between the power coupling state and the power separation state, and the control module is further configured to control the first transmission to switch between the first gear and the second gear.

In an embodiment, as shown in FIG. 3, when two sets of hydraulic power systems are provided, the control module shown in this embodiment is further communicatively connected to the first clutch and the second transmission respectively, and the control module is configured to control the input end of the first clutch and the output end of the first clutch to switch between the power coupling state and the power separation state. The control module is further configured to control the connection status among the input end of the speed change unit, the first output end of the speed change unit and the second output end of the speed change unit, and control the connection status between the input end of the speed change unit and the power take-off input end of the power take-off unit.

In an embodiment, the hybrid power system shown in this embodiment further includes a detection device, and the detection device is communicatively connected to the control module.

In an embodiment, as shown in FIG. 2, when one set of hydraulic power system is provided, the detection device is communicatively connected to the engine, the second clutch, the first power take-off, the first double-shaft extension motor and the first transmission respectively, and the detection device is configured to detect the rotary speed and power of the engine, the status of the second clutch, the status of the first power take-off, the rotary speed and power of the first double-shaft extension motor and the gear of the first transmission in real time. At this time, the detection device sends the detected information to the control module, and the control module controls the working status of the corresponding components accordingly.

In another embodiment, as shown in FIG. 3, when two sets of hydraulic power systems are provided, the detection device is communicatively connected to the engine, the first clutch, the second power take-off, the second transmission, the second double-shaft extension motor and the third double-shaft extension motor respectively, and the detection device is configured to detect the rotary speed and power of the engine, the state of the first clutch, the state of the second power take-off, the rotary speed and power of the second double-shaft extension motor, the rotary speed and power of the third double-shaft extension motor, and the status of the speed change unit and the power take-off unit in the second transmission in real time. At this time, the detection device sends the detected information to the control module, and the control module controls the working status of the corresponding components accordingly.

In an embodiment, as shown in FIG. 1 to FIG. 4, the hybrid power system shown in this embodiment is provided with a fuel mode, a pure electric mode and a hybrid power mode. In the case of the fuel mode, the engine is on, and the double-shaft extension motor is off or the double-shaft extension motor is used as an electric generator. In the case of the pure electric mode, the engine is off, the double-shaft extension motor is on, and the double-shaft extension motor is used as an electric motor. In the case of the hybrid power mode, both the engine and the double-shaft extension motor are on, at this time, the double-shaft extension motor is used as an electric motor.

The hybrid power system shown in this embodiment will be specifically described below with the structure shown in FIG. 3.

In FIG. 3, in this embodiment, two sets of hydraulic power systems are provided, which respectively are the pumping hydraulic system and the boom hydraulic system. The pumping hydraulic system and the second double-shaft extension motor are provided correspondingly, the boom hydraulic system and the third double-shaft extension motor are provided correspondingly, the second double-shaft extension motor and the second power take-off are provided correspondingly, and the third double-shaft extension motor and the power take-off unit in the second transmission are provided correspondingly.

The fuel mode shown in this embodiment will be specifically described below in conjunction with FIG. 3. The fuel mode at least includes the following operating modes.

In the first operating mode, the walking system has walking requirement, and the pumping hydraulic system and the boom hydraulic system have no hydraulic drive requirement. At this time, the input end of the first clutch and the output end of the first clutch are in the power coupling state, the second power take-off is in the separation state, the input end of the speed change unit and the power take-off input end of the power take-off unit in the second transmission are separated, the input end of the speed change unit is in a power coupling connection with the second output end of the speed change unit, so as to realize that the engine drives the drive shaft of the walking system to rotate.

In the second operating mode, the walking system has walking requirement, and the pumping hydraulic system and/or the boom hydraulic system has hydraulic drive requirement. At this time, the input end of the first clutch and the output end of the first clutch are in the power coupling state, and the input end of the speed change unit is in a power coupling connection with the second output end of the speed change unit. When the pumping hydraulic system has a hydraulic drive requirement, the second power take-off is in the power coupling state. When the boom hydraulic system has a hydraulic drive requirement, the input end of the speed change unit is in a power coupling connection with the power take-off input end of the power take-off unit, so as to realize that while the engine drives the drive shaft of the walking system to rotate, the engine also drives the pumping hydraulic system and/or the boom hydraulic system to operate.

In the third operating mode, the walking system has no walking requirement, and the pumping hydraulic system and/or boom hydraulic system has hydraulic drive requirement. At this time, the input end of the first clutch and the output end of the first clutch are in the power coupling state, and the input end of the speed change unit and the second output end of the speed change unit are separated. When the pumping hydraulic system has a hydraulic drive requirement, the second power take-off is in the power coupling state. When the boom hydraulic system has hydraulic drive requirement, the input end of the speed change unit is in a power coupling connection with the power take-off input end of the power take-off unit, so as to realize that the engine drives the pumping hydraulic system and/or the boom hydraulic system.

The pure electric mode shown in this embodiment will be described in detail below in conjunction with FIG. 3. The pure electric mode at least includes the following operating modes.

In the fourth operating mode, the walking system has walking requirement, the pumping hydraulic system and the boom hydraulic system have no hydraulic drive requirement. At this time, the input end of the first clutch and the output end of the first clutch are in a separation state, and the input end of the speed change unit is in a power coupling connection with the second output end of the speed change unit. The second power take-off is in the power coupling state, and/or the first output end of the speed change unit is in a power coupling connection with the second output end of the speed change unit, so as to realize that the second double-shaft extension motor and/or the third double-shaft extension motor drive the drive shaft of the walking system to rotate.

In the fifth operating mode, the walking system has walking requirement, the pumping hydraulic system and/or the boom hydraulic system has hydraulic drive requirement. At this time, the input end of the first clutch and the output end of the first clutch are in a separation state, and the input end of the speed change unit is in a power coupling connection with the second output end of the speed change unit. When the pumping hydraulic system has a hydraulic drive requirement, the second power take-off is in the power coupling state. When the boom hydraulic system has hydraulic drive requirement, the input end of the speed change unit is in a power coupling connection with the power take-off input end of the power take-off unit. Thus, in this embodiment, while realizing that the second double-shaft extension motor and/or the third double-shaft extension motor drives the drive shaft of the walking system to rotate, the second double-shaft extension motor and the third double-shaft extension motor also respectively drive the pumping hydraulic system and the boom hydraulic system in one-to-one correspondence.

In the sixth operating mode, when the walking system has no walking requirement and the pumping hydraulic system has hydraulic drive requirement, at this time, the second power take-off is in the separation state, so as to realize that the first double-shaft extension motor drives the pumping hydraulic system. When the boom hydraulic system has hydraulic drive requirement, at this time, the input end of the speed change unit and the second output end of the speed change unit in the second transmission are separated, the first output end of the speed change unit and the second output end of the speed change unit are separated, so as to realize that the second double-shaft extension motor drives the boom hydraulic system.

The hybrid power mode shown in this embodiment will be described in detail below in conjunction with FIG. 3. The hybrid power mode at least includes the following operating modes.

In the seventh operating mode, the walking system has walking requirement, and the pumping hydraulic system and the boom hydraulic system have no hydraulic drive requirement. At this time, the input end of the first clutch and the output end of the first clutch are in the power coupling state, and the second power take-off is in the power coupling state. The input end of the speed change unit is in a power coupling connection with the power take-off input end of the power take-off unit. The input end of the speed change unit is in a power coupling connection with the second output end of the speed change unit. The engine and the double-shaft extension motor simultaneously drive the drive shaft of the walking system to rotate. Since the pumping hydraulic system and the boom hydraulic system have no hydraulic drive requirement at this time, the hydraulic motors of the pumping hydraulic system and boom hydraulic system are in idle state, that is, the hydraulic motor does not pump oil. For example, when the hydraulic motor is an axial piston pump, if the swash plate inclination angle of the axial piston pump is adjusted to 0 degree, the axial piston pump will not pump oil.

In the eighth operating mode, the walking system has walking requirement, the pumping hydraulic system and/or the boom hydraulic system has hydraulic drive requirement. At this time, based on the seventh operating mode, the hydraulic motors of the pumping hydraulic system and the boom hydraulic system are in the pump oil state. While the engine and the double-shaft extension motor drive the drive shaft of the walking system to rotate, the engine and the double-shaft extension motor also drive the pumping hydraulic system and/or the boom hydraulic system.

In the ninth operating mode, when the walking system has no walking requirement and the pumping hydraulic system has hydraulic drive requirement. At this time, the input end of the first clutch and the output end of the first clutch are in the power coupling state, the second power take-off is in the power coupling state, so as to realize that the engine and the second double-shaft extension motor drive the pumping hydraulic system together. When boom hydraulic system has hydraulic drive requirement, at this time, the input end of the first clutch and the output end of the first clutch are in a power coupling state, the input end of the speed change unit and the second output end of the speed change unit are separated, the first output end of the speed change unit and the second output end of the speed change unit are separated, the input end of the speed change unit is in a power coupling connection with the power take-off input end of the power take-off unit, so as to realize that the engine and the third double-shaft extension motor drive the boom hydraulic system together.

Figure 5:
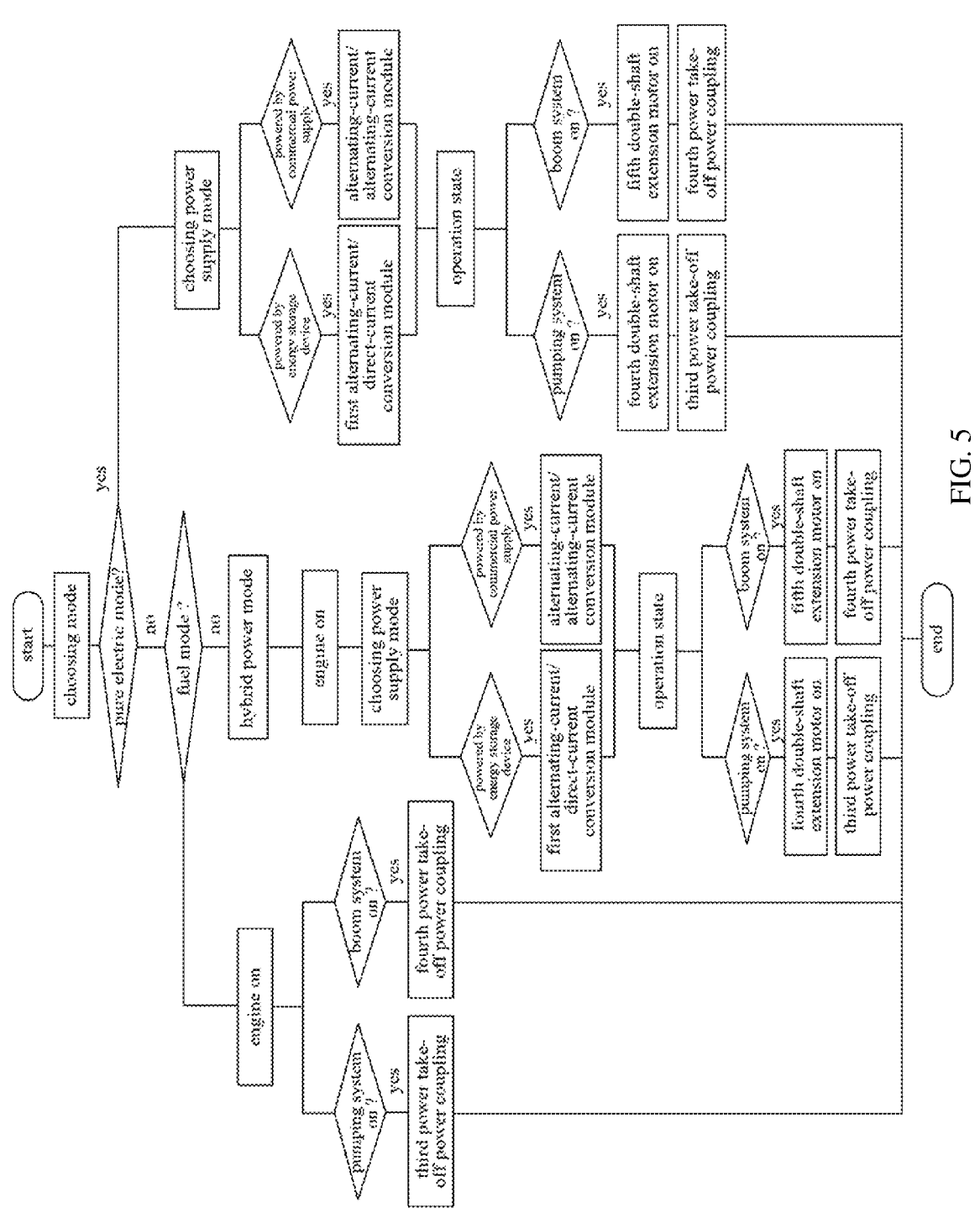
FIG. 5 is a schematic workflow chart of a hybrid power system provided according to the present application.

As shown in FIG. 4 and FIG. 5, this embodiment is provided with two power take-offs, which respectively are the third power take-off and the fourth power take-off. The third power take-off and the fourth double-shaft extension motor are provided correspondingly, and the fourth power take-off and the fifth double-shaft extension motor are provided correspondingly. In this way, in this embodiment, by controlling and changing the operating state of the third power take-off, the working state of the fourth power take-off and the working state of the third transmission, it can realize the above-mentioned fuel mode, pure electric mode or hybrid power mode. For details, please referring to the workflow described in FIG. 5. Here, the specific operating modes of the hybrid power system in FIG. 5 will not be described one by one.

In an embodiment, the embodiment further provides an operation machinery including the hybrid power system as described above.

Since the operating machinery adopts the hybrid power system shown in the above embodiment, the specific structure of the hybrid power system refers to the above embodiment. Since this operation machinery adopts all the technical solutions of all the above embodiments, it has at least all the beneficial effects brought by the technical solutions of the above embodiments, which will not be described again here.

In an embodiment, the operation machinery shown in this embodiment includes a concrete pump truck, and the hydraulic power system includes a pumping hydraulic system and a boom hydraulic system; and two double-shaft extension motors are provided, another end of one of the double-shaft extension motors is connected to the pumping hydraulic system, and another end of the other double-shaft extension motor is connected to the boom hydraulic system. Specifically, when the detection module shown in this embodiment detects that the hybrid power system is driven in fuel mode or pure electric mode and is insufficient in power, the control module can control the hybrid power system to switch to the hybrid power mode in time, so as to ensure the normal operation of the operation machinery.

It should be pointed out here that the pumping hydraulic system shown in this embodiment is configured to drive the hydraulic actuators such as the transmission cylinder or the swing cylinder on the concrete pump truck, and the boom hydraulic system is configured to control the retraction movements and extension movements of the upper boom on the concrete pump truck.

Finally, it should be noted that the above embodiments are only configured to illustrate the technical solution of the present invention, but not to limit it; although the present invention has been described in detail with reference to the foregoing embodiments, those of ordinary skill in the art should understand that: it is still possible to modify the technical solutions recorded in the foregoing embodiments, or to make equivalent replacements for some of the technical features, and these modifications or substitutions does not make the essence of the corresponding technical solution deviate from the spirit and scope of the technical solutions of each embodiment according to the present invention.

What is claimed is:

1. A hybrid power system, comprising:

an engine;

a power distribution device; and a double-shaft extension motor, wherein:

an output end of the engine is configured to drive a drive shaft of a walking system of an operation machinery, the operation machinery is provided with at least one set of hydraulic power system;

an input end of the power distribution device is connected to the output end of the engine, a first power output end of the power distribution device is connected to one end of the drive shaft, the input end of the power distribution device is connected to the first power output end of the power distribution device; a second power output end of the power distribution device is connected to one end of the double-shaft extension motor, and the second power output end of the power distribution device is configured to selectively be coupled with the input end of the power distribution device or separated from the input end of the power distribution device; another end of the double-shaft extension motor is configured to connect with the hydraulic power system; and the power distribution device is provided with a power coupling state and a separation state; in the power coupling state, the first power output end of the power distribution device and the second power output end of the power distribution device form a power coupling connection, so that the engine is connected to the double-shaft extension motor; in the separation state, the input end of the power distribution device and the second power output end of the power distribution device are separated, so that the engine and the double-shaft extension motor are separated.

2. The hybrid power system according to claim 1, wherein the power distribution device is a power take-off, a plurality of the power take-offs are provided in one-to-one correspondence with the double-shaft extension motor, and other ends of the plurality of the double-shaft extension motors are configured to connect to multiple sets of the hydraulic power systems in one-to-one correspondence.

3. The hybrid power system according to claim 1, wherein:

the power distribution device is a power take-off;

the hybrid power system further comprises: a first transmission; the power take-off comprises a first power take-off; the double-shaft extension motors comprise a first double-shaft extension motor;

the output end of the engine is connected to an input end of the first power take-off, a first power output end of the first power take-off is connected to an input end of the first transmission, and an output end of the first transmission is connected to one end of the drive shaft; a second power output end of the first power take-off is connected to one end of the first double-shaft extension motor; and the first transmission at least comprises a first gear and a second gear, when the first transmission is in the first gear, the input end of the first transmission is separated from the output end of the first transmission; when the first transmission is in the second gear, the input end of the first transmission is in a power coupling connection with the output end of the first transmission.

4. The hybrid power system according to claim 1, wherein:

the power distribution device is a power take-off;

the hybrid power system further comprises: a second transmission; the power take-off comprises a second power take-off, and the double-shaft extension motors comprise a second double-shaft extension motor and a third double-shaft extension motor;

the second transmission comprises a speed change unit and a power take-off unit; an output end of the power take-off unit is connected to a first output end of the speed change unit, or an output end of the power take-off unit is a first output end of the speed change unit; an input end of the speed change unit is configured to selectively connect to a power take-off input end of the power take-off unit or a second output end of the speed change unit; the first output end of the speed change unit and the second output end of the speed change unit are configured to selectively in a power coupling or separate;

the output end of the engine is connected to an input end of the second power take-off, a first power output end of the second power take-off is connected to the input end of the speed change unit, a second power output end of the second power take-off is connected to one end of the second double-shaft extension motor, and another end of the second double-shaft extension motor is configured to connect with a pumping hydraulic system; and the first output end of the speed change unit is connected to one end of the third double-shaft extension motor, another end of the third double-shaft extension motor is configured to connect with a boom hydraulic system, and the second output end of the speed change unit is connected to one end of the drive shaft.

5. The hybrid power system according to claim 4, further comprising:

a first clutch, wherein an input end of the first clutch is connected to the output end of the engine, and an output end of the first clutch is connected to the input end of the second power take-off.

6. The hybrid power system according to claim 2, further comprising:

a third transmission, wherein:

the power take-off comprises a third power take-off and a fourth power take-off; the double-shaft extension motors comprise a fourth double-shaft extension motor and a fifth double-shaft extension motor;

the output end of the engine is connected to an input end of the third power take-off, a first power output end of the third power take-off is connected to an input end of the third transmission, an output end of the third transmission is connected to an input end of the fourth power take-off, and a first power output end of the fourth power take-off is connected to one end of the drive shaft;

a second power output end of the third power take-off is connected to one end of the fourth double-shaft extension motor, and another end of the fourth double-shaft extension motor is configured to connect with a pumping hydraulic system; a second power output end of the fourth power take-off is connected to one end of the fifth double-shaft extension motor, and another end of the fifth double-shaft extension motor is configured to connect with a boom hydraulic system; and the third transmission at least comprises a first gear and a second gear, when the third transmission is in the first gear, the input end of the third transmission is separated from the output end of the third transmission; when the third transmission is in the second gear, the input end of the third transmission is in a power coupling connection with the output end of the third transmission.

7. The hybrid power system according to claim 1, further comprising:

a first alternating-current/direct-current conversion module; and a second alternating-current/direct-current conversion module, wherein:

an alternating-current side of the first alternating-current/direct-current conversion module is electrically connected to a stator winding of the double-shaft extension motor, and a direct-current side of the first alternating-current/direct-current conversion module is configured to electrically connect to an energy storage module; and an alternating-current side of the second alternating-current/direct-current conversion module is configured to be electrically connected to a commercial power supply, and a direct-current side of the second alternating-current/direct-current conversion module is configured to electrically connect to the energy storage module.

8. The hybrid power system according to claim 1, further comprising:

an alternating-current/alternating-current conversion module; and a control module, wherein:

one end of the alternating-current/alternating-current conversion module is electrically connected to a stator winding of the double-shaft extension motor, and another end of the alternating-current/alternating-current conversion module is configured to electrically connect to a commercial power supply; or the control module is communicatively connected to the engine, the hydraulic power system, the power distribution device and the double-shaft extension motor respectively.

9. An operation machinery, comprising the hybrid power system according to claim 1.

10. The operation machinery according to claim 9, further comprising:

a concrete pump truck, wherein:

the hydraulic power system comprises a pumping hydraulic system and a boom hydraulic system; and two double-shaft extension motors are provided, another end of one of the two double-shaft extension motors is connected to the pumping hydraulic system, and another end of the other double-shaft extension motor is connected to the boom hydraulic system.

* * * * *